United States Patent
Ramalho et al.

(10) Patent No.: US 10,003,377 B1
(45) Date of Patent: Jun. 19, 2018

(54) SPREAD SPECTRUM ACOUSTIC COMMUNICATION TECHNIQUES

(71) Applicant: Cisco Technology, Inc., San Jose, CA (US)

(72) Inventors: Michael A. Ramalho, Lakewood Ranch, FL (US); Mihailo Zilovic, Lawrenceville, NJ (US); David A. Benham, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/383,246

(22) Filed: Dec. 19, 2016

(51) Int. Cl.
   *G10L 19/00* (2013.01)
   *H04B 1/69* (2011.01)
   *G10L 19/16* (2013.01)
   *G10L 19/02* (2013.01)

(52) U.S. Cl.
   CPC ............ *H04B 1/69* (2013.01); *G10L 19/0212* (2013.01); *G10L 19/167* (2013.01)

(58) Field of Classification Search
   CPC ............ G10L 19/0212; G10L 19/0204; G10L 19/022; G10L 19/16; H04B 1/665; H04B 1/66; H04B 1/667; G06F 17/142; G06F 17/147; H04N 5/602; H03M 7/3053
   USPC .... 704/230, 229, 200.1, 500–504, 203, 205, 704/204, 219, 258; 341/50, 51, 108–110; 375/240, 240.03, 240.25; 708/203, 402
   See application file for complete search history.

(56) References Cited

U.S. PATENT DOCUMENTS 5,142,656 A * 8/1992 Fielder .................... G06T 9/005
                                                        704/203
5,184,316 A * 2/1993 Sugiyama .............. H04N 19/60
                                                        375/E7.088

(Continued)

FOREIGN PATENT DOCUMENTS

CN          104753561 A       7/2015

OTHER PUBLICATIONS

T. Yoshioka, et al., "Making Machines Understand Us in Reverberant Rooms", [Robustness against reverberation for automatic speech recognition], Fundamental Technologies in Modern Speech Recognition, IEEE Signal Processing Magazine, Nov. 2012, 13 pages.

(Continued)

*Primary Examiner* — Vijay B Chawan
(74) *Attorney, Agent, or Firm* — Edell, Shapiro & Finnan, LLC (57) ABSTRACT

In a transmit method, a set of data eigenvectors that are based on a Prometheus Orthonormal Set (PONS) code construction and orthogonal to each other are stored, wherein each of the data eigenvectors is mapped to a unique multi-bit word. A pilot sequence representing a pilot eigenvector that is based on the PONS code construction and orthogonal to each of the data eigenvectors is generated. Input data is grouped into multi-bit words and ones of the data eigenvectors mapped to the multi-bit words are selected. A spread data sequence including the selected ones of the data eigenvectors and that is synchronized to the pilot sequence is generated. An acoustic signal including the synchronized pilot sequence and the spread data sequence is generated. The acoustic signal is transmitted.

20 Claims, 10 Drawing Sheets

(56) References Cited

U.S. PATENT DOCUMENTS

| | | | | |
|---|---|---|---|---|
| 5,301,255 A | * | 4/1994 | Nagai | G10L 19/0204 704/200 |
| 5,349,549 A | * | 9/1994 | Tsutsui | G06F 17/142 708/402 |
| 5,357,594 A | * | 10/1994 | Fielder | G06T 9/005 704/200.1 |
| 5,363,096 A | * | 11/1994 | Duhamel | G06F 17/142 341/50 |
| 5,394,473 A | * | 2/1995 | Davidson | G10L 19/0212 375/240 |
| 5,471,558 A | * | 11/1995 | Tsutsui | H04B 1/665 704/200.1 |
| 5,479,562 A | * | 12/1995 | Fielder | G06T 9/005 704/200.1 |
| 5,506,623 A | * | 4/1996 | Sako | H04N 19/503 375/240.03 |
| 5,619,197 A | * | 4/1997 | Nakamura | H04B 1/665 341/50 |
| 5,636,324 A | * | 6/1997 | Teh | H04B 1/665 704/226 |
| 5,913,186 A | * | 6/1999 | Byrnes | H04B 1/667 704/203 |
| 6,141,337 A | | 10/2000 | Uta et al. | |
| 7,852,318 B2 | | 12/2010 | Altman | |
| 8,212,854 B2 | | 7/2012 | Marton et al. | |
| 8,259,603 B2 | | 9/2012 | Kuroda et al. | |
| 2003/0043775 A1 | | 3/2003 | Kikuchi | |
| 2004/0071195 A1 | | 4/2004 | Huang et al. | |

OTHER PUBLICATIONS

K.K. Wong, et al., "Spread Spectrum Techniques for Indoor Wireless IR Communications", Optical Wireless Communications, IEEE Wireless Communications, Apr. 2003, 11 pages.

H. Delic, et al., "The Prometheus Orthonormal Set for Wideband CDMA", IEEE MELECON 2004, May 12-15, 2004, Dubrovnik, Croatia, 4 pages.

* cited by examiner

SPREAD SPECTRUM ACOUSTIC COMMUNICATION TECHNIQUES

TECHNICAL FIELD

The present disclosure relates to acoustic spread spectrum communications.

BACKGROUND

Room environments are challenging for transmission of information via acoustic signals. This is due to the extreme multi-path nature of an impulse response of the room from the transmission source (loudspeaker) to wherever the capture device (microphone) resides. Although humans are well adapted for this environment, traditional forms of communications (e.g. using acoustic tones and pulses) have difficulty operating reliably in such an environment. As an example, direct path sound may be as much as 20 dB below a sum of reverberant sound (non-direct path sound) when the loudspeaker and the microphone are separated by 30 feet in a typical conference room.

DESCRIPTION OF EXAMPLE EMBODIMENTS

Overview

In a transmit method, a set of data eigenvectors that are based on a Prometheus Orthonormal Set (PONS) code construction and orthogonal to each other are stored, wherein each of the data eigenvectors is mapped to a unique multi-bit word. A pilot sequence representing a pilot eigenvector that is based on the PONS construction and orthogonal to each of the data eigenvectors is generated. Input data is grouped into multi-bit words and ones of the data eigenvectors mapped to the multi-bit words are selected. A spread data sequence including the selected ones of the data eigenvectors and that is synchronized to the pilot sequence is generated. An acoustic signal including the synchronized pilot sequence and the spread data sequence is generated. The acoustic signal is transmitted.

In a receive method, (i) a set of data eigenvectors that are based on a Prometheus Orthonormal Set (PONS) code construction and orthogonal to each other is stored, wherein each of the data eigenvectors is mapped to a unique multi-bit word, and (ii) a replica of a pilot eigenvector that is also based on the PONS and is orthogonal to each of the data eigenvectors is stored. An acoustic signal including a pilot sequence representing the pilot eigenvector and at least one of the data eigenvectors synchronized to the pilot sequence is received. A pilot sequence and timing of the pilot sequence are detected using the replica. Based on the timing of the pilot sequence, a data frame in the acoustic signal that is occupied by the at least one data eigenvector is identified. Which data eigenvector in the set of data eigenvectors is a best match to the at least one of the data eigenvectors in the data frame is determined. The multi-bit word that is mapped to the data eigenvector determined to be the best match to the at least one of the data eigenvectors is outputted.

Example Embodiments

Figure 1:
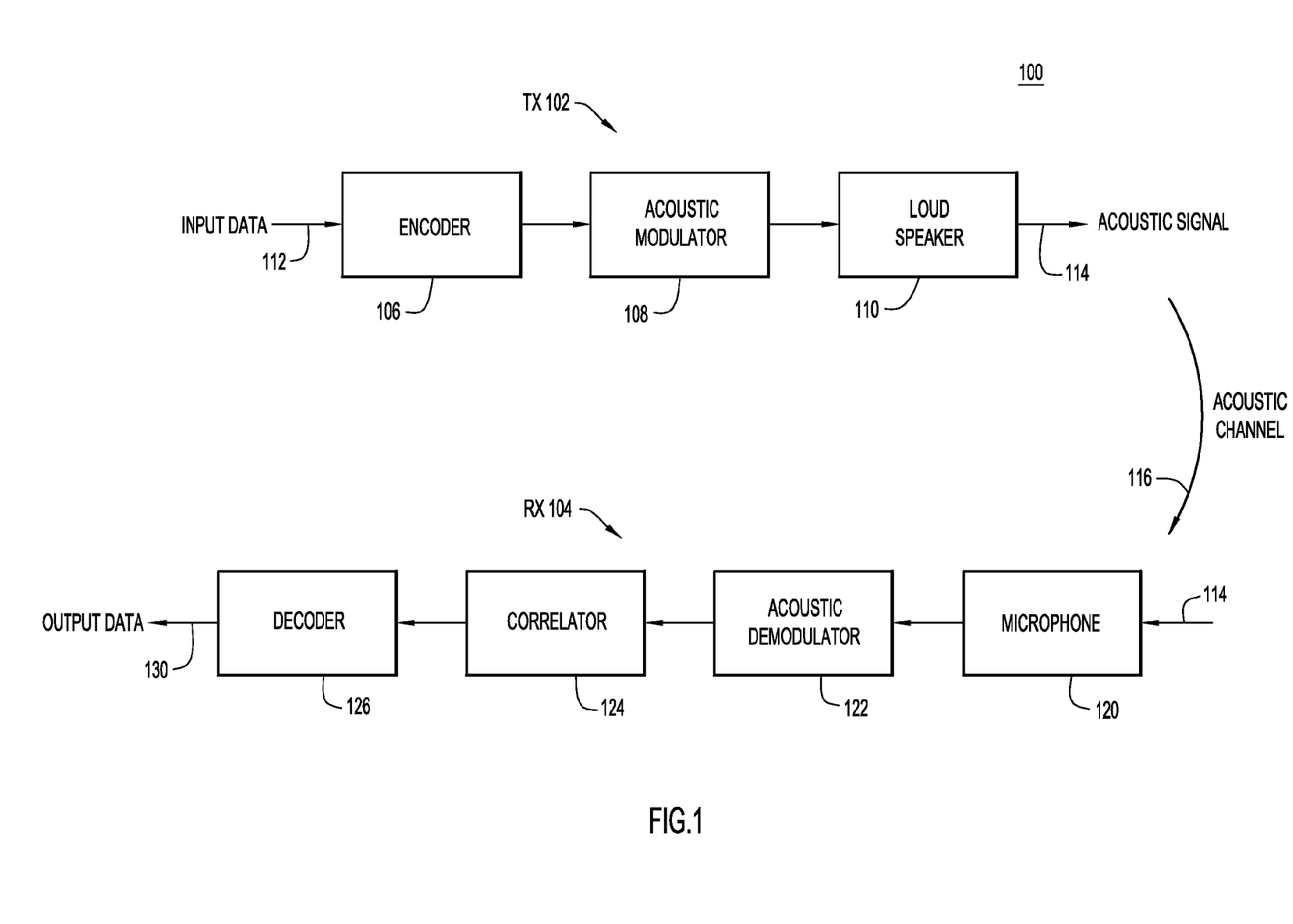
FIG. 1 is a block diagram of a spread spectrum acoustic communication system, including a spread spectrum acoustic transmitter and a spread spectrum acoustic receiver, in which pilot sequence and spreading codes based on the Prometheus Orthonormal Set (PONS) may be used, according to an example embodiment.

With reference to FIG. 1, there is shown a block diagram of an example spread spectrum (SS) acoustic communication system 100 in which spreading codes based on the Prometheus Orthonormal Set (PONS) may be used. Communication system 100 includes a spread spectrum acoustic transmitter (TX) 102 and a spread spectrum acoustic receiver (RX) 104. Acoustic transmitter 102 includes an encoder 106, an acoustic modulator 108, and a loudspeaker 110 that perform sequential signal processing to convert input data 112 to a spread spectrum acoustic signal 114 that includes a pilot sequence and a spread data sequence that are time synchronized with each other. Loudspeaker 110 transmits acoustic signal 114 over an acoustic channel 116. Acoustic signal 114 may have a frequency spectrum in an audible frequency band of human hearing (e.g., up to 20 kHz), an ultrasound frequency band (e.g., above 20 kHz), or a frequency band that spans both the audible and the ultrasound frequency bands. Acoustic receiver 104 includes a microphone 120, acoustic demodulator 122, a correlator 124, and a decoder 126 that perform sequential signal processing on acoustic signal 114 (when received) to convert the received acoustic signal to output data 130 representative of input data 112.

TX 102 employs spreading codes based on the PONS (referred to as "PONS codes" or "PONS sequences") to generate acoustic signal 114 from input data 112, and RX 102 employs the PONS codes to recover output data 130 from the acoustic signal. The PONS codes are based on Shapiro polynomials, which have coefficients +/−1. That is, each PONS code includes a sequence of coefficients in which each of the coefficients is +/−1. PONS codes are generated based on a PONS construction. The PONS construction expands the Shapiro polynomials via a concatenation rule defined below. Working with sequences formed by the polynomial coefficients, various PONS matrices are as follows.

Starting with:

$$P_1 = \begin{bmatrix} P_{1,1} \\ Q_{1,1} \end{bmatrix} = \begin{bmatrix} 1 & 1 \\ 1 & -1 \end{bmatrix},$$

Concatenation leads to:

$$P_2 = \begin{bmatrix} P_{2,1} \\ Q_{2,1} \\ P_{2,2} \\ Q_{2,2} \end{bmatrix} = \begin{bmatrix} P_{1,1} & Q_{1,1} \\ P_{1,1} & -Q_{1,1} \\ Q_{1,1} & P_{1,1} \\ -Q_{2,2} & P_{1,1} \end{bmatrix}$$

$$= \begin{bmatrix} 1 & 1 & 1 & -1 \\ 1 & 1 & -1 & 1 \\ 1 & -1 & 1 & 1 \\ -1 & 1 & 1 & 1 \end{bmatrix},$$

and letting $$P_{m-1} = \begin{bmatrix} P_{m-1,1} \\ Q_{m-1,1} \\ \vdots \\ P_{m-1,2^{m-2}} \\ Q_{m-1,2^{m-2}} \end{bmatrix}$$

which is of dimensions $2^{m-1} \times 2^{m-1}$ with each row being one of the $2^{m-1}$ PONS sequences, the $2^m \times 2^m$ PONS matrix is obtained by $$P_m = \begin{bmatrix} P_{m,1} \\ Q_{m,1} \\ P_{m,2} \\ Q_{m,2} \\ \vdots \\ P_{m,2^{m-1}-1} \\ Q_{m,2^{m-1}-1} \\ P_{m,2^{m-1}} \\ Q_{m,2^{m-1}} \end{bmatrix} = \begin{bmatrix} P_{m-1,1} & Q_{m-1,1} \\ P_{m-1,1} & -Q_{m-1,1} \\ Q_{m-1,1} & P_{m-1,1} \\ -Q_{m-1,1} & P_{m-1,1} \\ \vdots & \vdots \\ P_{m-1,2^{m-1}} & Q_{m-1,2^{m-2}} \\ P_{m-1,2^{m-2}} & -Q_{m-1,2^{m-2}} \\ Q_{m-1,2^{m-2}} & P_{m-1,2^{m-2}} \\ -Q_{m-1,2^{m-2}} & P_{m-1,2^{m-2}} \end{bmatrix}.$$

Thus, in one example of a 4×4 PONS matrix:

$$P_{2^S,2^S} = \begin{bmatrix} 1 & 1 & 1 & -1 \\ 1 & 1 & -1 & 1 \\ 1 & -1 & 1 & 1 \\ -1 & 1 & 1 & 1 \end{bmatrix} \quad \begin{aligned} P_{2^S,2^S} * P_{2^S,2^S}^T &= 4*I \\ P_{2^K,2^K} * P_{2^K,2^K}^T &= 2^K*I \end{aligned}$$

and any row/column can be negated and still have $P*P^T = (2^K)*I$.

According to the PONS construction described above, PONS codes are defined in a PONS matrix P having $2^K$ rows and $2^K$ columns of PONS coefficients each equal to +/−1. Each row/column represents a code that may be used (i) to spread input data 112 to produce a spread data sequence that achieves spread spectrum gain, or (ii) directly as a pilot signal (i.e., pilot sequence) having autocorrelation properties useful for pilot synchronization, as described below in connection with FIG. 2. In the ensuing description, the term "PONS eigenvector" may be used synonymously and interchangeably with the terms "PONS code" or "PONS sequence." Thus, a "PONS eigenvector" or simply "eigenvector" refers to a sequence of PONS coefficients.

Figure 2:
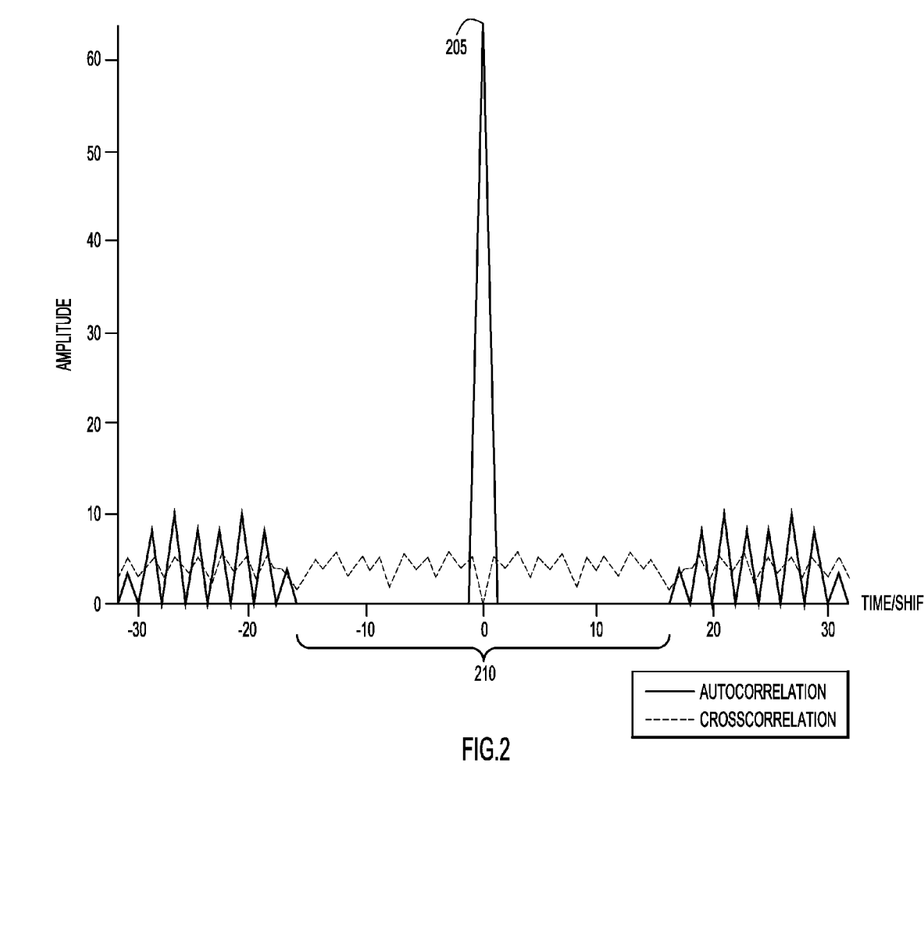
FIG. 2 is a magnitude vs. time-shift plot of PONS cross-correlation and autocorrelation averages for PONS codes or eigenvectors of order $2^K$ where K=6, according to an example embodiment.

With reference to FIG. 2, there is a magnitude vs. time-shift plot of PONS cross-correlation and autocorrelation amplitude averages for PONS codes or eigenvectors of order $2^K$ where K=6, i.e., defined in the PONS matrix $P_{64,64}$. PONS matrix $P_{64,64}$ defines 64 PONS eigenvectors (rows), each having a length of 64 PONS coefficients (i.e., $2^6$ PONS coefficients). The autocorrelation plot includes an autocorrelation peak 205 at time shift zero (corresponding to when a PONS eigenvector is time-aligned with itself). Autocorrelation peak 205 is centered in time within a relatively wide zero-autocorrelation-zone (ZAZ) 210 equal to ½ the length of the PONS eigenvector. When TX 102 generates acoustic signal 114 so as to include one of the PONS eigenvectors as a pilot sequence, RX 104 exploits ZAZ 210 for pilot sequence synchronization, as described below.

Figure 3:
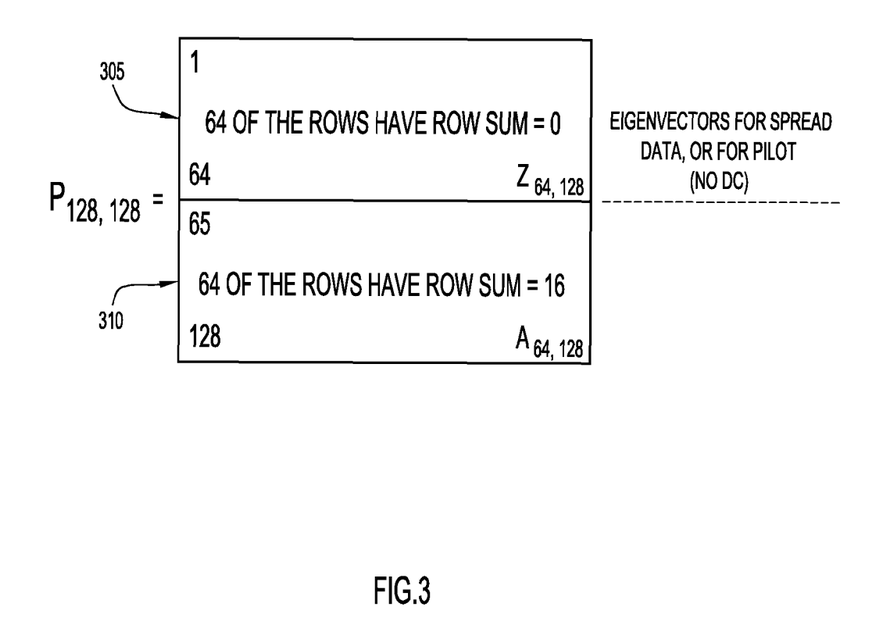
FIG. 3 is an illustration of the PONS matrix $P_{128,128}$, which defines PONS eigenvectors of order $2^7$, according to an example embodiment.

With reference to FIG. 3, there is an illustration of the PONS matrix $P_{128,128}$, which defines PONS eigenvectors of order $2^7$, i.e., K=7. That is, PONS matrix $P_{128,128}$ defines a set of 128 ($2^7$) PONS eigenvectors (rows) each having a length of 128 PONS coefficients. The set of 128 PONS eigenvectors is divided in half into a first half/subset 305 of PONS eigenvectors and a second half/subset 310 of PONS eigenvectors. Each PONS eigenvector in first half 305 includes 128 PONS coefficients that sum together to a value of zero. These PONS eigenvectors are referred to as "zero-sum" eigenvectors. Each PONS eigenvector in second half 310 includes 128 PONS coefficients that sum together to a value of 16. This exemplifies a general property of the PONS construction, which, when K is odd (e.g., K=7 for PONS matrix $P_{128,128}$), half of the PONS eigenvectors in the corresponding PONS matrix P are zero-sum PONS eigenvectors, while the other half are not. The zero-sum and the non-zero sum PONS eigenvectors may be used both as pilot sequences and to spread input data to produce spread data sequences; however, it is advantageous to use the zero-sum PONS eigenvectors because their use eliminates a direct current (DC) component from the resulting pilot sequences and spread data sequences. The use of zero-sum eigenvectors is thus especially useful for baseband (i.e., non-modulated) implementations of this invention.

Another property of zero-sum PONS eigenvectors exploited in embodiments presented herein is that the zero-sum PONS eigenvectors are timewise orthogonal to each other across different eigenvector lengths that are odd powers of 2 (i.e., across lengths of $2^K$, where K takes on a range of odd values). For example, 4 PONS eigenvectors each of length $2^9$, when time-aligned with a PONS eigenvector of length $2^{11}$, are each orthogonal to the longer PONS eigenvector. The timewise orthogonality occurs over many different pairs of odd powers of two, such as pairs of lengths including $2^{13}/2^{11}$, $2^{11}/2^9$, and $2^9/2^7$. Orthogonality also occurs across odd powers of two greater than two, such as $2^{13}/2^9$. An example of such orthogonality will be described in connection with FIG. 6.

Figure 4:
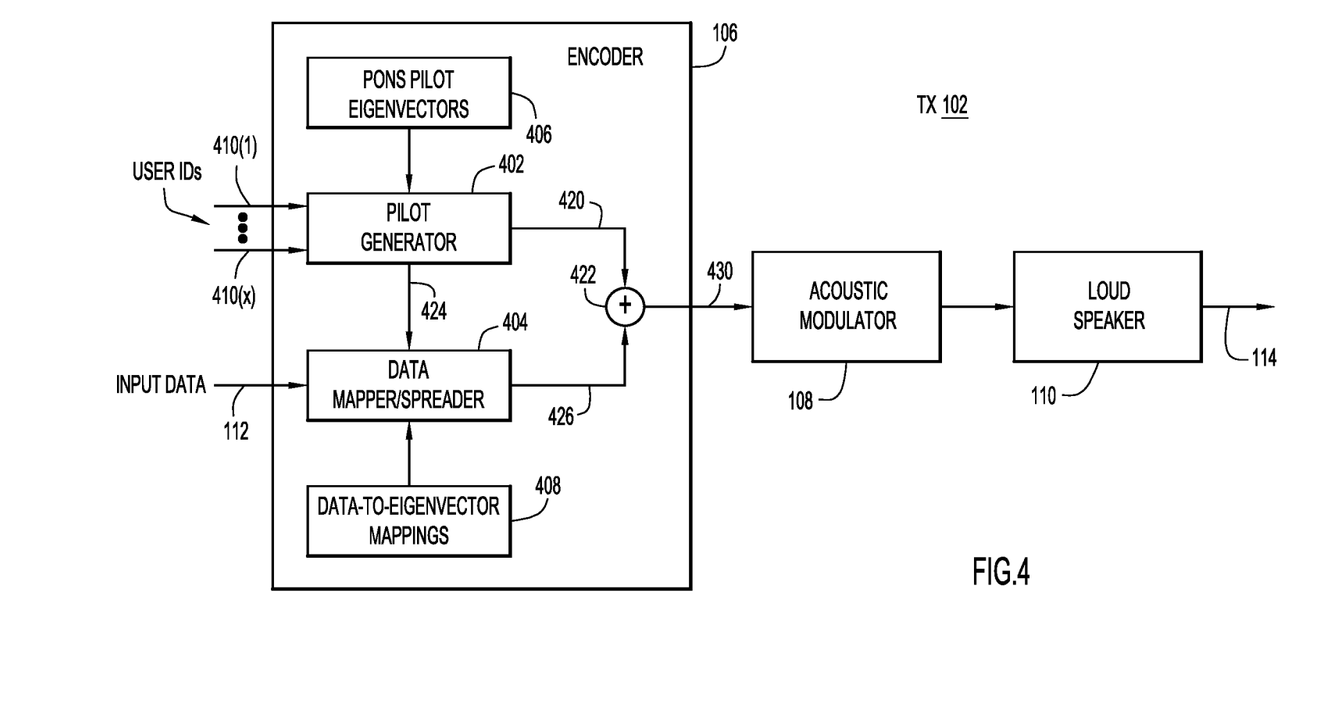
FIG. 4 is a block diagram of the spread spectrum acoustic transmitter that expands on an encoder of the transmitter, according to an example embodiment.

With reference to FIG. 4, there is a block diagram of TX 102 that shows details of encoder 106, according to an embodiment. Encoder 106 includes a pilot generator 402 and a data mapper/spreader 404. Encoder 106 stores PONS pilot eigenvectors 406 in a memory of TX 102 (not shown), each of which may be used to generate a pilot sequence for spread spectrum synchronization. Encoder 106 also stores in the memory data-to-eigenvector mappings 408 configured to map multi-bit words of input data 112 to PONS data eigenvectors (also referred to as "user eigenvectors" because they are used to spread user data) based on the values of the multi-bit words, such that each mapping uniquely maps a respective one of the multi-bit words to a corresponding one of the PONS data eigenvectors. Thus, each PONS data eigenvector represents a spread version of its mapped multi-bit word in order to achieve spread spectrum gain in communication system 100 (assuming each bit of the multi-bit word corresponds to multiple PONS coefficients).

Pilot generator 402 receives distinct user identifiers (IDs) 410(1)-410(X) to identify different users and selects a PONS pilot eigenvector from PONS pilot eigenvectors 406 corresponding to one of the user identifiers. In this way, pilot generator 402 may select different ones of PONS pilot eigenvectors 406 corresponding to different ones of user identifiers 410(1)-410(X). In accordance with pilot generator timing synthesized by a time base not shown in FIG. 4, pilot generator 402 generates/outputs the selected pilot eigenvector as a pilot sequence 420 that extends across a pilot frame, such that the pilot sequence begins and ends where the pilot frame begins and ends in time, respectively. Pilot generator 402 provides pilot sequence 420 to a mixer 422. Pilot generator 402 also provides to data mapper/spreader 404 a timing or synchronization signal 424 representative of the pilot generator timing used to generate pilot sequence 420, i.e., representative of the pilot frame.

Data mapper/spreader 404 receives input data 112, groups the input data as it arrives into multi-bit words or "tokens," and maps each of the multi-bit words (i.e., tokens) to a corresponding data eigenvector based on data-to-eigenvector mappings 408. Data mapper/spreader 404 outputs the corresponding data eigenvectors in sequence as a spread data sequence 426 based on synchronization signal 424, such that the sequence of data eigenvectors collectively spans and is time-aligned (i.e., synchronized) with pilot sequence 420 (i.e., with the pilot frame). The output data eigenvectors span/occupy respective sequential data frames that are time-aligned with the pilot frame, such that a first one of the data eigenvectors/data frames in the sequence of data eigenvectors/data frames begins where pilot sequence 420 (i.e., the pilot frame) begins, and a last one of the data eigenvectors/data frames ends where the pilot sequence/pilot frame ends in time. Mixer 422 mixes pilot sequence 420 with spread data sequence 426 (i.e., the sequence of data eigenvectors spanning the pilot frame) to produce a spread spectrum baseband signal 430 that includes the pilot sequence and the data eigenvectors time-aligned or synchronized with each other. Over time as encoder 106 receives input data 112, pilot generator 402 and data mapper/spreader 404 repeatedly perform their respective operations described above to generate time-aligned pilot sequences and spread data sequences.

Acoustic modulator 108 and loudspeaker 110 together generate acoustic signal 114 from baseband signal 430 and transmit the acoustic signal over acoustic channel 116. Acoustic modulator 108 can move the frequency spectrum occupied by acoustic signal 114 arbitrarily in frequency via amplitude modulation, although other forms of narrowband modulation are possible (e.g., low-index frequency or phase modulation). In an example, acoustic modulator may include an up-sampler followed by a root raised cosine filter.

Figure 5:
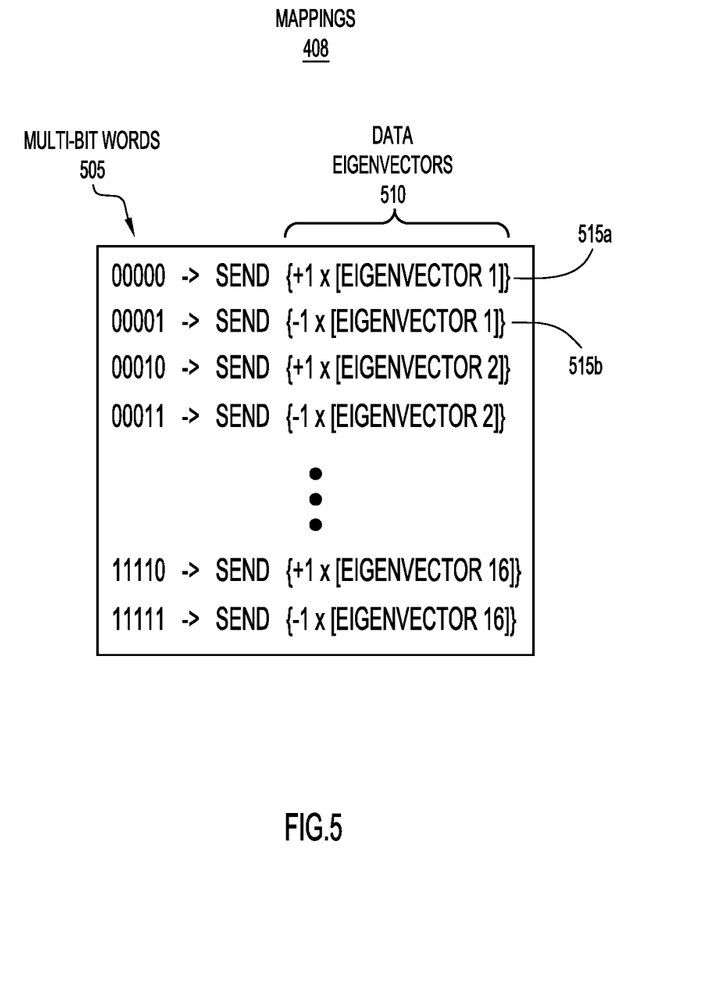
FIG. 5 is an illustration of data-to-eigenvector mappings used in the spread spectrum acoustic transmitter, according to an embodiment.

With reference to FIG. 5, there is an illustration of example data-to-eigenvector mappings for mappings 408. In the example of FIG. 5, mappings 408 include 32 5-bit words 505 (0000-11111) mapped to corresponding ones of 32 data eigenvectors 510. Each data eigenvector (e.g., data eigenvector 515a) has a corresponding data eigenvector (e.g., 515b) that is a negated version of the data eigenvector (e.g., of data eigenvector 515a). Thus, data eigenvectors 510 include a first subset of 16 data eigenvectors and a second subset of 16 data eigenvectors for a total of 32 data eigenvectors, where each data eigenvector in the second subset is a negated version of a corresponding one of the data eigenvectors in the first set.

In the example of FIG. 5, the 16 possible positive data eigenvectors (choices) yields 32 different possible data eigenvectors (i.e., the 16 positive data eigenvectors and their negatives) to mix with pilot sequence 420. All of the 32 data eigenvectors can be uniquely resolved at RX 104. Because 32 data eigenvectors translates to $2^5$ possibilities, encoder 106 can take 5 bits (i.e., a 5-bit word) and, dependent on the value of the bits, send one of the 32 data eigenvectors to RX 104. Upon reception of the one of the data eigenvectors, RX 104 can map-back to the 5 bits. The process performed at RX 104 will be described more fully below in connection with FIG. 7.

More generally, each data eigenvector of data-to-eigenvector mappings 408 is a PONS eigenvector of order $2^M$ (M is odd), and each pilot eigenvector of PONS pilot eigenvectors 406 is a PONS eigenvector of order $2^{M+K}$ (K is even and >0). In an example, K=2. As mentioned above, use of pilot eigenvectors and data eigenvectors having respective lengths that are different odd powers of 2 ensures that each pilot eigenvector is timewise orthogonal with each data eigenvector when the pilot eigenvector is aligned with the data eigenvector. As a result, in FIG. 4, pilot sequence 420 (representing the pilot eigenvector selected from PONS pilot eigenvectors 404 according a given user ID 410($i$)) is orthogonal to each of the data eigenvectors in spread data sequence 426 time-aligned with the pilot sequence.

Figure 6:
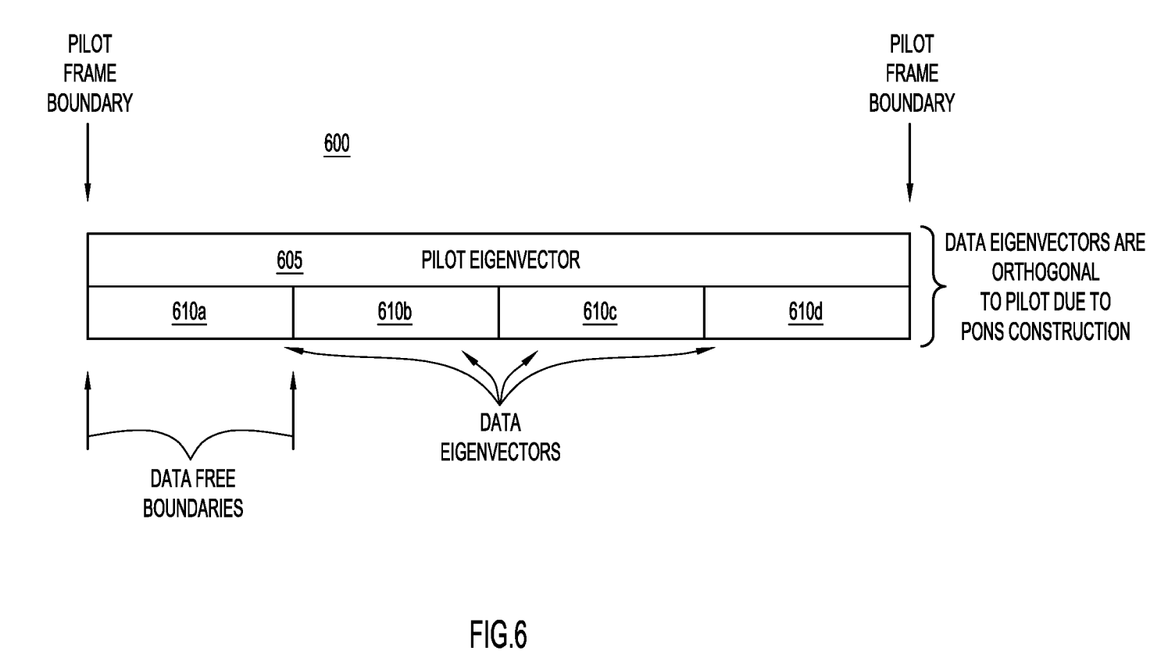
FIG. 6 is an illustration of a timing relationship between a PONS pilot eigenvector and a sequence of PONS data eigenvectors generated by the spread spectrum acoustic transmitter, according to an embodiment.

With reference to FIG. 6, there is an illustration of an example timing relationship 600 between a pilot sequence 605 (the selected pilot eigenvector) and a sequence of contiguous data eigenvectors 610a, 610b, 610c, and 610d as would exist in baseband signal 430 and correspondingly in acoustic signal 114. Pilot sequence 605 spans a pilot frame and each of data eigenvectors 610$i$ spans a respective data frame in acoustic signal 114. In the example of FIG. 6, each data eigenvector 610$i$ is of order $2^9$ (length=512 coefficients), while pilot eigenvector 605 is of order $2^{11}$ (length=2048 coefficients, or 4 times the length of the data eigenvector). With the illustrated timing relationship in which the full extent of data eigenvectors 6105a-610d begins an ends in time alignment with pilot eigenvector 605, and due to the properties of the PONS construction, each data eigenvector 610$i$ is orthogonal to the portion of the pilot eigenvector of the same length. Such orthogonality advantageously simplifies decoding of acoustic signal 114 at RX 104 because the pilot sequence need not be removed/subtracted from the acoustic signal prior to it being decoded.

In the example of FIG. 6, there is a minimum difference in odd powers of two between pilot sequence 605 and data eigenvectors 610 (which is 2, such as $2^{11}/2^9$), which yields the largest possible ZAZ for the data eigenvectors. If there is reverberation in a room in which communication system 100 is deployed resulting in data eigenvector reflections within the ZAZ of the data eigenvector, such reflections will be cancelled at RX 104. Reverberations outside of the ZAZ of the data eigenvector appear as uncorrelated noise. As long as there is sufficient spread spectrum gain (due to data spreading) to overcome the uncorrelated noise, it will be possible for RX 104 to decode individual data eigenvectors. Thus, communication system 100 exploits both the ZAZ property of the PONS codes and spread spectrum gain to overcome room reflections and reverberation.

Figure 7:
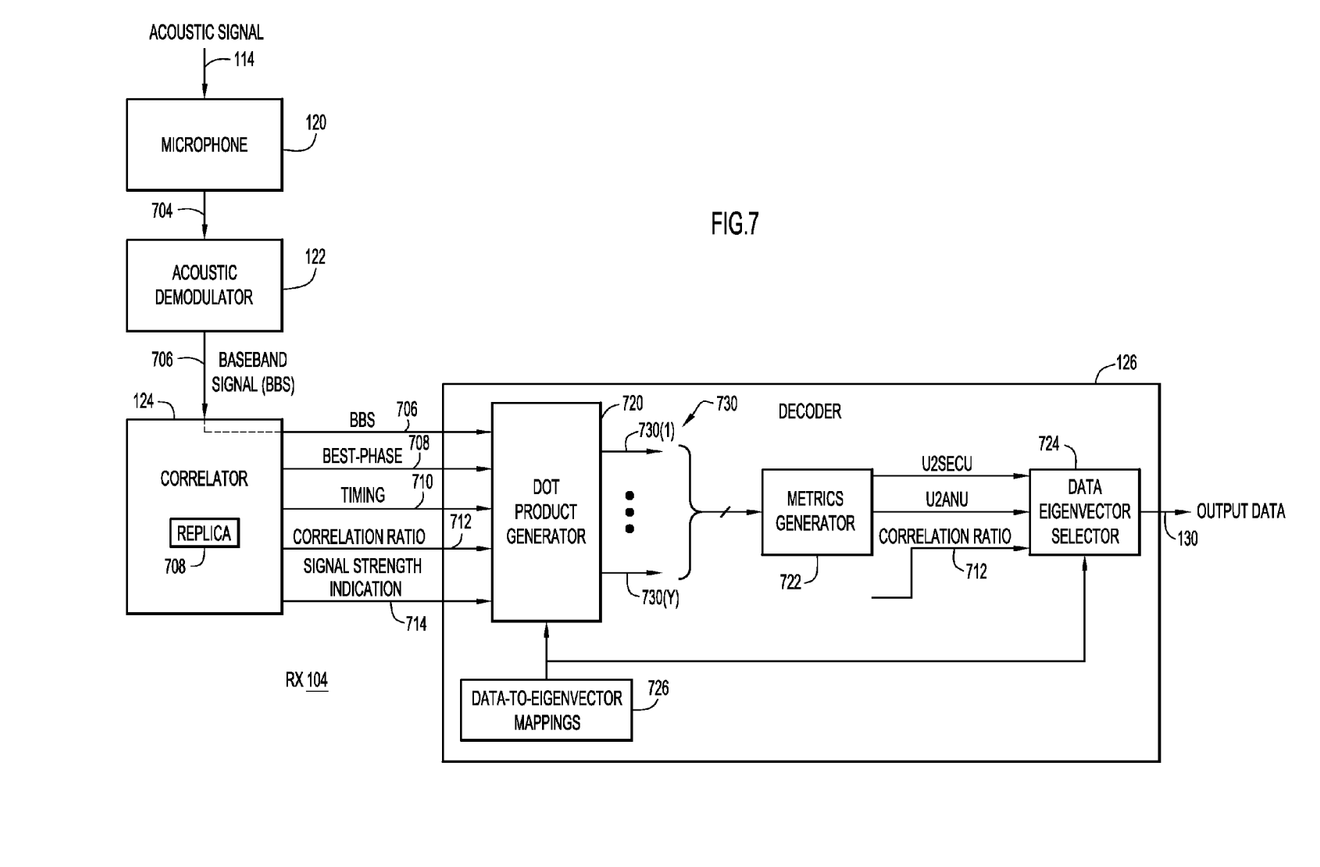
FIG. 7 is a block diagram of the spread spectrum acoustic receiver that expands on a decoder of the receiver, according to an embodiment, according to an embodiment.

With reference to FIG. 7, there is a block diagram of RX 104 that expands on decoder 126, according to an embodiment. When RX 104 receives acoustic signal 114, microphone 120 detects acoustic signal 114 to produce detected acoustic signal 704. Acoustic demodulator 122 demodulates detected acoustic signal 704 to produce a baseband signal 706, and provides the baseband signal to correlator 124. In an example, acoustic demodulator includes a root raised cosine filter followed by a down-sampler. Correlator 124 correlates baseband signal 706 with a replica 708 of the pilot eigenvector selected by pilot generator 402 and used to generate pilot sequence 420 in TX 102, to produce correlation amplitudes that are used to detect the presence of the pilot sequence (i.e., the selected pilot eigenvector) in baseband signal 706. Correlator 124 detects the pilot sequence as a correlation peak (i.e., an autocorrelation peak) among the correlation amplitudes. The magnitude (level) of the autocorrelation peak relative to the non-peak values defines a quality of "lock" of correlator 124 on the pilot sequence (e.g., lower amplitude corresponds to lower quality lock or even failure to lock, and vice versa).

Correlator 124 also derives (i) a best sampling phase 708 for sampling baseband signal 706, and (ii) a timing signal 710 indicative of pilot frame timing and thus data frame timing (e.g., the time position of the pilot and data frames in baseband signal 706) based on the detected autocorrelation peak magnitude. Correlator 124 provides best sampling phase 708, timing signal 710, and baseband signal 706 to decoder 126. Correlator 124 may also derive a correlation ratio metric 712 indicative of whether correlator 124 has detected and locked-onto the pilot sequence. A correlation ratio (value) below a predetermined correlation ratio threshold indicates that correlator 124 has detected and locked-onto the pilot sequence, while a correlation ratio equal to or above the correlation ratio threshold indicates that the correlator has not detected and locked-onto the pilot sequence.

The quality of lock, as indicated by the correlation ratio, is described briefly. When an acoustic space, such as a room, in which RX 104 is deployed is sounded with an acoustic signal that includes only a pilot sequence (i.e. no data eigenvector is mixed with the pilot sequence), correlator 124 produces a cross-correlation result that is an impulse response of the room. RX 104 locks-on to energy from a dominant signal path, even if that energy is a time-delayed version of a direct signal path. However, whenever the direct signal path and the dominant signal path deliver energy of similar magnitudes, the time difference between the two paths is no more than about 10 milliseconds. For this reason, the quality of lock is given by an inverse ratio of a peak absolute magnitude of the cross-correlation to a secondary peak absolute magnitude which occurs in a region of 50 milliseconds to 10 milliseconds before the peak absolute magnitude occurs. In an embodiment, this is the abovementioned correlation ratio. The 50 to 10 millisecond region is within the ZAZ of the pilot sequence (i.e., when no data eigenvector is present, the secondary peak absolute magnitude should be zero, and thus the correlation ratio is zero).

The correlation ratio takes into account pilot sequence power relative to spread data sequence power and a length of the pilot sequence relative to that of the data eigenvectors. The correlation ratio, in the absence of any noise is well below 0.2. The correlation ratio can degrade (i.e., increase) due to room noise. A correlation ratio below 0.75 is adequate to determine a quality lock in highly reverberant rooms.

In addition to the correlation ratio metric, another signal-strength metric may optionally be generated from the cross-correlation peak. Using similar methodology to the correlation ratio metric, an average power is computed from the samples in the region 50 milliseconds to 10 milliseconds before the peak by summing the squared value of those samples and dividing by the number of those samples. A signal strength metric can be formed by the power of the cross-correlation peak (its squared value) divided by the average power found in the 50 to 10 millisecond region. Such a metric, expressed in dB, has been useful in determining how strong the received signal is in comparison to the received noise. The optional signal-strength metric is depicted as signal strength indication 714 in FIG. 7, and may be used in conjunction with the correlation ratio metric.

Decoder 126 derives/recovers output data 130 from baseband signal 706 based on best sampling phase 708 and timing signal 710. Decoder 126 operates as a data despreader/demapper because it performs operations reverse to those performed by data mapper/spreader 404. In one embodiment, decoder 126 recovers output data 130 from baseband signal 706 in the presence of the pilot sequence, i.e., without removing the pilot sequence from the baseband signal. This is practically achievable because the time-aligned pilot sequence and data eigenvectors representing the output data are orthogonal to each other based on the PONS construction. In another embodiment, decoder 126 (or correlator 124) removes/subtracts the pilot sequence from baseband signal 706 before the decoder recovers output data 130, i.e., the output data is recovered in the absence of the pilot sequence.

Decoder 126 includes a dot-product generator 720, a metrics generator 722, a data eigenvector selector 724, and data-to-eigenvector mappings 726 stored in a memory of RX 104 (not shown), which are copies of mappings 408 in TX 102. For each data frame spanned by the pilot frame in baseband signal 706, dot-product generator 720 performs a respective dot-product operation between each data eigenvector in mappings 726 and the signal energy in the data frame, to produce respective ones of dot-product amplitudes 730 indicative of respective similarities between the signal energy and the corresponding data eigenvectors (e.g., the higher the dot-product amplitude the more similar are the signal energy and the corresponding eigenvector) for that data frame. Dot-product amplitudes 730 are also referred to as "eigenvector projections." For example, dot-product generator 720 performs: a first dot-product operation between a first data eigenvector in mappings 726 and the data frame, to produce a first dot-product amplitude 730(1) indicative of a similarity between the energy in the data frame and the first data eigenvector; a second dot-product operation between the data frame and a second data eigenvector in mappings 726, to produce a second dot-product amplitude 730(2) indicative of a similarity between the energy in the data frame and the second data eigenvector; and so on across Y data eigenvectors in mappings 726. More generally, dot-product generator 720 projects each of the data eigenvectors in mappings 726 onto the energy in the data frame (which is simply a time segment of baseband signal 706 equal to a length of a data eigenvector) to produce respective projected amplitudes 730 indicative of similarity. Although the pilot sequence may contribute undesired energy to the data frame, the undesired energy does not contribute to any of the projected amplitudes due to orthogonality between the pilot sequence and each of the projected data eigenvectors. Other operations besides dot-product operations may be used to generate such projections/amplitudes indications of similarity.

In the absence of any noise, all of the energy/power in the data frame should project on the data eigenvector that occupies the data frame (as inserted by encoder 106). To the extent that the projection onto other data eigenvectors in the set of data eigenvectors yields significant energy in those eigenvector projections, this indicates imperfect reception. In the limit, when noise is sufficient to overcome an ability of RX 104 to recover the data eigenvectors from acoustic signal 114, the projected energy is spread equally over all possibilities/data eigenvectors. Accordingly, metrics generator 722 generates two power metrics used to determine a level of confidence that a highest one of the eigenvector projections represents a correct data eigenvalue.

Metrics generator 722 computes the two confidence metrics based on eigenvector projections 730 as now described. Metrics generator 722 determines a largest eigenvector projection P(Largest) and a next largest eigenvector projection P(Next_Largest) among eigenvector projections 730. Metrics generator 722 also computes an average $P_{AVG}$ of all eigenvector projections 730. Metrics generator 722 computes a first power metric "user-to-next largest ratio" U2SecU, in dB, which is a ratio of largest eigenvector projection P(Largest) to next largest eigenvector projection P(Next_Largest), as follows:

$$U2SecU=10*\log_{10}[P(\text{Largest})/P(\text{Next\_Largest})].$$

Metrics generator 722 computes a second power metric "user-to-average-non-user ratio" U2ANU, in dB, which is a ratio of largest eigenvalue projection P(Largest) to average $P_{AVG}$, as follows:

$$U2ANU=10*\log_{10}[P(\text{Largest})/P_{AVG}].$$

Metrics generator 722 provides the first and second power metrics to data eigenvector selector 724.

Data eigenvector selector 724 receives power metrics U2SecU and U2ANU, and may also receive correlation ratio 712. In an embodiment, selector 724 tests whether power metric U2SecU is above a first predetermined threshold and whether second power metric U2ANU is above a second predetermined threshold. If both tests pass, then data selector 724 selects the data eigenvector among mappings 726 whose dot-product resulted in largest eigenvector projection P(Largest) as a best match to the energy in the data frame, and outputs the multi-bit word mapped to that (best matched) data eigenvector in mappings 726. If both tests do not pass, then data selector 724 does not select one of the data eigenvectors from mappings 726 and does not output any multi-bit word.

In another embodiment, selector 724 tests whether power metric U2SecU is above the first predetermined threshold, whether second power metric U2ANU is above the second predetermined threshold, and whether the correlation ratio is below the correlation ratio threshold (mentioned above). If all three tests pass, then data selector 724 selects the data eigenvector among mappings 726 whose dot-product resulted in largest eigenvector projection P(Largest) as a best match to the energy in the data frame, and outputs the multi-bit word mapped to that data eigenvector. If all three tests do not pass, then data selector 724 does not select one of the data eigenvectors from mappings 726 and does not output any multi-bit word. In an example, the first threshold is 2 dB, the second threshold is 11 dB, and the correlation ratio threshold is 0.7, although other values for these thresholds may be used.

Decoder 126 repeats its above-described operations for each data frame in the pilot frame to recover respective multi-bit words for each of the data frames. Decoder 126 repeats this process over time for each received pilot frame.

Communication system 100 relies on spread spectrum gain and the PONS code ZAZ properties to overcome room acoustics. The PONS codes used for the pilot eigenvector and data eigenvectors as described above allows for successful decode when the desired signal is well below the noise (i.e., at negative SNRs). For example, a −5 dB in-band signal-to-noise ratio (SNR) has been attained using pilot sequence/data eigenvector orders $2^{11}/2^9$ (and a pilot to data amplitude ratio of 60%). If it is desired to improve correct decoding of the transmitted acoustic signal at a close distance, while a listener at a further distance is not necessarily able to be decoded correctly, a lower spread spectrum gain (i.e., lower-order spreading codes) may be used. Thus, communication system 100 may advantageously "tune spreading as a function of expected reverberation."

Communication system 100 may be used in shared work spaces because multiple ones of the communication systems can exist in the same room/volume if different pilot sequences (pilot eigenvectors) are used by the different communication systems and different communication systems are sufficiently closely synchronized in time. This can be achieved using different ones of user IDs 410. Since the speed of sound is relatively slow relative to radio waves, this is possible using services, such as running the Network Time Protocol (NTP), on different components of the communication systems.

The embodiments presented herein provide many advantages.

a. The embodiments employ spread spectrum gain to overcome room reverberation in all spaces/rooms of interests (e.g., rooms not requiring presenter amplification). This allows for decoding of the dominant energy path signal in the presence of much larger reverberant energy.

b. The embodiments, by using the same code construction for both the pilot and spread data sequences/signals, render the pilot signal orthogonal to the spread data signal which allows for a simple decoder design.

c. The embodiments, by using spreading codes with large ZAZs, effectively render to zero early reflection energy within the ZAZ in comparison to other types of spreading codes in systems that do not employ such large ZAZ spreading codes.

d. The embodiments, by using pilot signals with ZAZs, allow for the creation of a robust synchronization metric (e.g., correlation ratio), which is advantageous for acoustic environment applications.

e. The codes employed by the embodiments, being a power of two based construction, can be designed to have any desired spread spectrum gain; allowing the embodiments to be tailored to low spread spectrum gain to high spread spectrum gain designs/applications.

f. Multiple communication systems, via pilot code design, can be made to operate in the same room volume—allowing for shared workspace designs.

Figure 8:
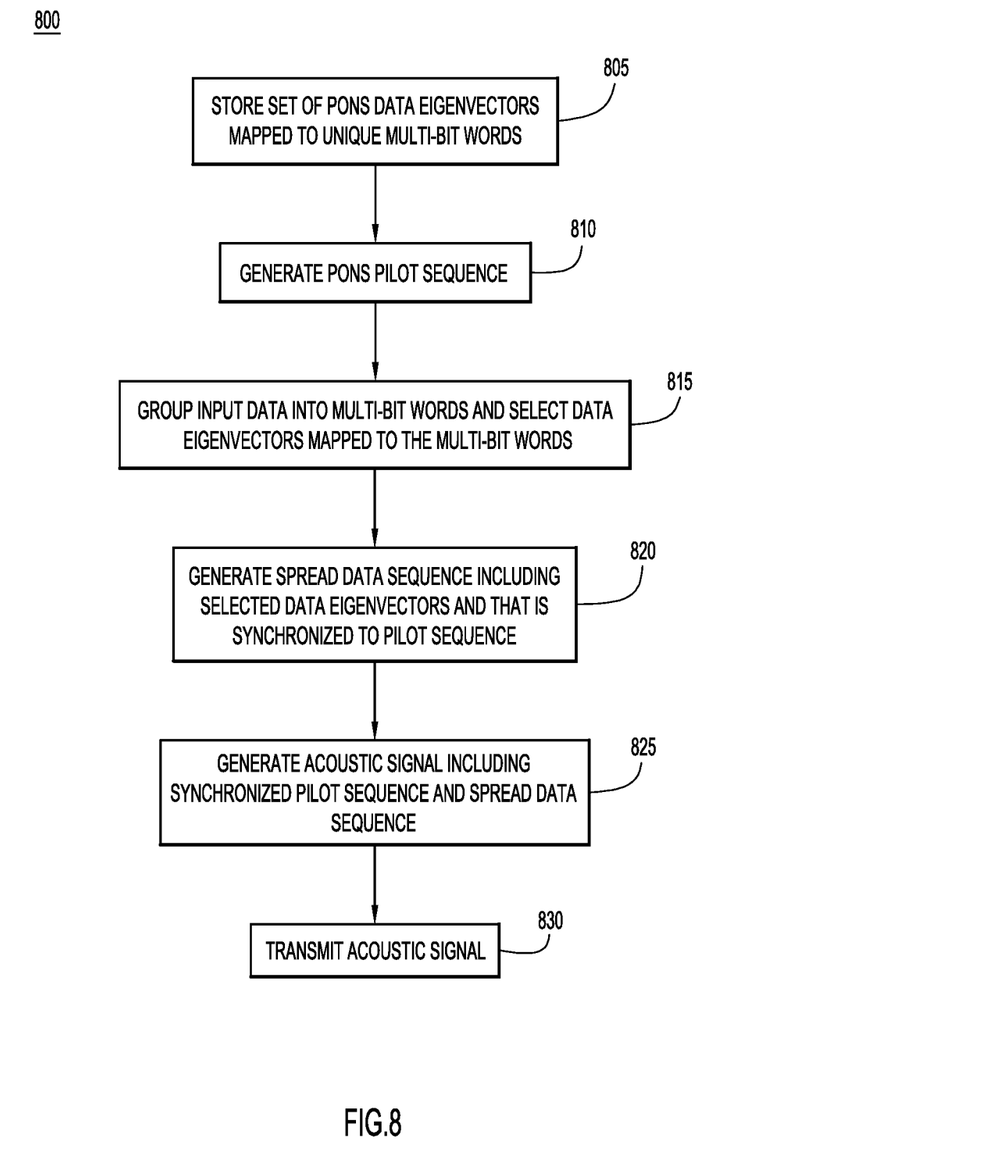
FIG. 8 is a flowchart of a transmit method performed by the spread spectrum acoustic transmitter, according to an example embodiment.

With reference to FIG. 8, there is a flowchart of an example transmit method 800 performed by TX 102.

At 805, TX 102 stores a set of data eigenvectors in mappings 408 that are based on the Prometheus Orthonormal Set (PONS) code construction and orthogonal to each other, wherein each of the data eigenvectors is mapped to a unique multi-bit word.

At 810, TX 102 generates pilot sequence 420 representing a selected pilot eigenvector that is also based on the PONS construction and orthogonal to each of the data eigenvectors.

At 815, TX 102 groups input data 112 into multi-bit words and selects ones of the data eigenvectors mapped to the multi-bit words.

At 820, TX 102 generates spread data sequence 426 including the selected ones of the data eigenvectors and that is synchronized to pilot sequence 420.

At 825, TX 102 generates acoustic signal 114 including synchronized pilot sequence 420 and spread data sequence 426.

At 830, TX 102 transmits acoustic signal 114.

Figure 9:
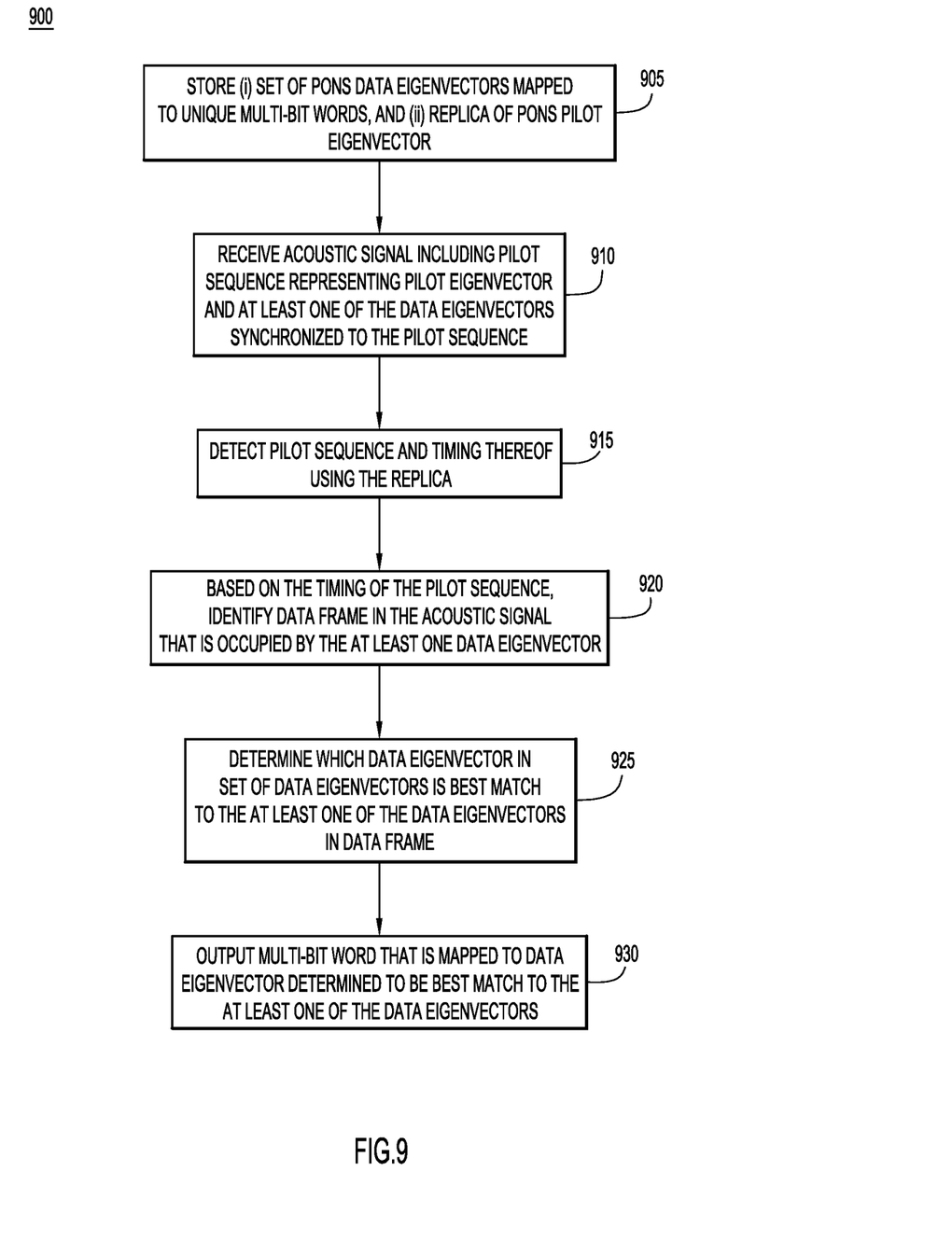
FIG. 9 is a flowchart of a receive method performed by the spread spectrum acoustic receiver, according to an example embodiment.

With reference to FIG. 9, there is a flowchart of an example receive method 900 performed by RX 104.

At 905, RX 104 stores (i) a set of data eigenvectors in mappings 726 that are based on the Prometheus Orthonormal Set (PONS) code construction and orthogonal to each other, wherein each of the data eigenvectors is mapped to a unique multi-bit word, and (ii) replica 708 of a pilot eigenvector that is also based on the PONS and is orthogonal to each of the data eigenvectors.

At 910, RX 104 receives acoustic signal 114 including a pilot sequence representing the pilot eigenvector and at least one of the data eigenvectors synchronized to the pilot sequence.

At 915, RX 104 detects the pilot sequence and its associated timing using replica 708.

At 920, RX 104 identifies a data frame in the acoustic signal that is occupied by the at least one data eigenvector based on the timing of the detected pilot sequence.

At 925, RX 104 determines which data eigenvector in the set of data eigenvectors is a best match to the at least one of the data eigenvectors in the data frame.

At 930, RX 104 outputs the multi-bit word that is mapped to the data eigenvector determined to be the best match to the at least one of the data eigenvectors.

Figure 10:
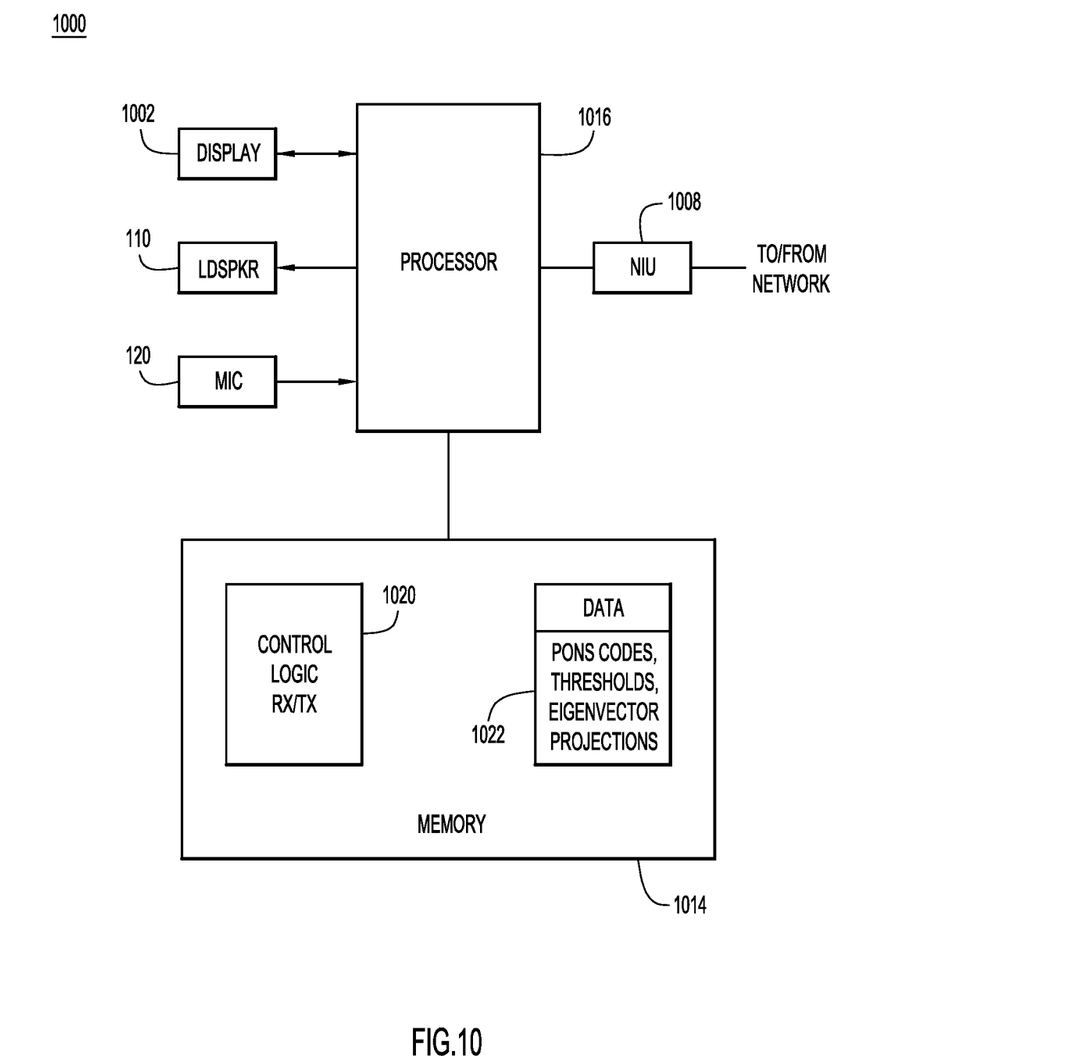
FIG. 10 is a block diagram of a communication device in which the spread spectrum acoustic transmitter and the spread spectrum acoustic receiver may be implemented, according to an example embodiment.

With reference to FIG. 10, there is a block diagram of an example communication device 1000 in which TX 102, RX 104, or both may be implemented. There are numerous possible configurations for device 1000 and FIG. 10 is meant to be an example. Examples of device 1000 include a tablet computer, a personal computer, a laptop computer, a mobile phone, such as a smartphone, or a video conference endpoint. Device 1000 may include a display 1002, loudspeaker 110, microphone 120, one or more network interface units (NIUs) 1008, and memory 1014 each coupled to a processor 1016. The one or more NIUs 1008 may include wired and/or wireless connection capability that allows processor 1016 to communicate over a communication network. For example, NIUs 1008 may include an Ethernet card to communicate over an Ethernet connection, a wireless RF transceiver to communicate wirelessly with cellular networks in the communication network, optical transceivers, and the like, as would be appreciated by one or ordinary skill in the relevant arts.

Processor 1016 may include a collection of microcontrollers and/or microprocessors, for example, each configured to execute respective software instructions stored in the memory 1014. The collection of microcontrollers may include, for example: a video controller to receive, send, and process video signals or images related to display 1002; an audio processor to receive, send/transmit, and process audio/sound signals related to loudspeaker 110 and microphone 120 as described herein; and a high-level controller to provide overall control. Portions of memory 1014 (and the instructions therein) may be integrated with processor 1016. As used herein, the terms "audio" and "sound" are synonymous and interchangeable.

The memory 1014 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1014 may comprise one or more computer readable storage media (e.g., a memory device) encoded with software comprising computer executable instructions and when the software is executed (by the processor 1016) it is operable to perform the operations described herein. For example, the memory 1014 stores or is encoded with instructions for control logic 1020 to perform operations described herein related to TX 102 and RX 104.

In addition, memory 1014 stores data/information 1022 used and generated by logic 1020.

In summary, in one form, a method is provided comprising: storing a set of data eigenvectors that are based on a Prometheus Orthonormal Set (PONS) code construction and orthogonal to each other, wherein each of the data eigenvectors is mapped to a unique multi-bit word; generating a pilot sequence representing a pilot eigenvector that is based on the PONS code construction and orthogonal to each of the data eigenvectors; grouping input data into multi-bit words and selecting ones of the data eigenvectors mapped to the multi-bit words; generating a spread data sequence including the selected ones of the data eigenvectors and that is synchronized to the pilot sequence; generating an acoustic signal including the synchronized pilot sequence and the spread data sequence; and transmitting the acoustic signal.

In another form, an apparatus is provided that includes an encoder configured to: store a set of data eigenvectors that are based on a Prometheus Orthonormal Set (PONS) code construction and orthogonal to each other, wherein each of the data eigenvectors is mapped to a unique multi-bit word; generate a pilot sequence representing a pilot eigenvector that is based on the PONS code construction and orthogonal to each of the data eigenvectors; group input data into multi-bit words and selecting ones of the data eigenvectors mapped to the multi-bit words; and generate a spread data sequence including the selected ones of the data eigenvectors and that is synchronized to the pilot sequence; a modulator configured to generate an acoustic signal including the synchronized pilot sequence and the spread data sequence; and a loudspeaker configured to transmit the acoustic signal.

In yet another form, a method is provided comprising: storing (i) a set of data eigenvectors that are based on a Prometheus Orthonormal Set (PONS) code construction and orthogonal to each other, wherein each of the data eigenvectors is mapped to a unique multi-bit word, and (ii) a replica of a pilot eigenvector that is also based on the PONS code construction and is orthogonal to each of the data eigenvectors; receiving an acoustic signal including a pilot sequence representing the pilot eigenvector and at least one of the data eigenvectors synchronized to the pilot sequence; detecting the pilot sequence and timing of the pilot sequence using the replica; based on the timing of the pilot sequence, identifying a data frame in the acoustic signal that is occupied by the at least one of the data eigenvectors; determining which data eigenvector in the set of data eigenvectors is a best match to the at least one of the data eigenvectors in the data frame; and outputting the multi-bit word that is mapped to the data eigenvector determined to be the best match to the at least one of the data eigenvectors.

The methods described herein can also be embodied by software instructions stored in a non-transitory computer readable storage medium, that when executed by at least one processor, cause the processor to perform the operations of the respective methods described herein.

The above description is intended by way of example only. Various modifications and structural changes may be made therein without departing from the scope of the concepts described herein and within the scope and range of equivalents of the claims.

What is claimed is:

1. A method comprising:
    storing a set of data eigenvectors that are based on a Prometheus Orthonormal Set (PONS) code construction and orthogonal to each other, wherein each of the data eigenvectors is mapped to a unique multi-bit word;
    generating a pilot sequence representing a pilot eigenvector that is based on the PONS code construction and orthogonal to each of the data eigenvectors;
    grouping input data into multi-bit words and selecting ones of the data eigenvectors mapped to the multi-bit words;
    generating a spread data sequence including the selected ones of the data eigenvectors and that is synchronized to the pilot sequence;
    generating an acoustic signal including the synchronized pilot sequence and the spread data sequence; and
    transmitting the acoustic signal.

2. The method of claim 1, wherein each of the data eigenvectors includes a sequence of PONS coefficients having a length equal to a first odd power of 2 and the pilot eigenvector includes a sequence of PONS coefficients having a second length equal to a second odd power of 2.

3. The method of claim 2, wherein the first odd power of two is less than the second odd power of 2 such that the pilot eigenvector spans multiple successive ones of the selected data eigenvectors in time.

4. The method of claim 3, wherein the first odd power of two is less than the second odd power of two by 2.

5. The method of claim 1, wherein each of the data eigenvectors and the pilot eigenvector includes a respective sequence of PONS coefficients that sum together to a value of zero.

6. The method of claim 1, wherein the set of data eigenvectors includes a first subset of data eigenvectors and a second subset of data eigenvectors, wherein each data eigenvector in the second set of data eigenvectors is a negated version of a corresponding data eigenvector in the first subset of eigenvectors.

7. The method of claim 1, further comprising, prior to the generating the pilot sequence, selecting the pilot eigenvector used for the pilot sequence from among a set of orthogonal pilot eigenvectors all based on the PONS code construction and which are all orthogonal to all of the data eigenvectors.

8. The method of claim 1, wherein:
    the generating the pilot sequence includes deriving timing of the pilot sequence;
    the generating the spread data sequence includes outputting the selected ones of the data eigenvectors in sequence in accordance with the timing of the pilot sequence so that the pilot sequence and the selected ones of the data eigenvectors are synchronized; and
    generating the acoustic signal includes:
        mixing the selected data eigenvectors in the spread data sequence with the pilot sequence to produce a mixed signal; and
        generating the acoustic signal from the mixed signal so that the acoustic signal has a frequency spectrum in an audio frequency band.

9. An apparatus comprising:
    an encoder configured to:
        store a set of data eigenvectors that are based on a Prometheus Orthonormal Set (PONS) code construction and orthogonal to each other, wherein each of the data eigenvectors is mapped to a unique multi-bit word;
        generate a pilot sequence representing a pilot eigenvector that is based on the PONS code construction and orthogonal to each of the data eigenvectors;
        group input data into multi-bit words and selecting ones of the data eigenvectors mapped to the multi-bit words; and
        generate a spread data sequence including the selected ones of the data eigenvectors and that is synchronized to the pilot sequence;
    a modulator configured to generate an acoustic signal including the synchronized pilot sequence and the spread data sequence; and
    a loudspeaker configured to transmit the acoustic signal.

10. The apparatus of claim 9, wherein each of the data eigenvectors includes a sequence of PONS coefficients having a length equal to a first odd power of 2 and the pilot eigenvector includes a sequence of PONS coefficients having a second length equal to a second odd power of 2.

11. The apparatus of claim 10, wherein the first odd power of two is less than the second odd power of 2 such that the pilot eigenvector spans multiple successive ones of the selected data eigenvectors in time.

12. The apparatus of claim 9, wherein each of the data eigenvectors and the pilot eigenvector includes a respective sequence of PONS coefficients that sum together to a value of zero.

13. A method comprising:
    storing (i) a set of data eigenvectors that are based on a Prometheus Orthonormal Set (PONS) code construction and orthogonal to each other, wherein each of the data eigenvectors is mapped to a unique multi-bit word, and (ii) a replica of a pilot eigenvector that is also based on the PONS code construction and is orthogonal to each of the data eigenvectors;
    receiving an acoustic signal including a pilot sequence representing the pilot eigenvector and at least one of the data eigenvectors synchronized to the pilot sequence;
    detecting the pilot sequence and timing of the pilot sequence using the replica, the detecting including correlating the acoustic signal with the replica of the pilot eigenvector;
    based on the timing of the pilot sequence, identifying a data frame in the acoustic signal that is occupied by the at least one of the data eigenvectors;
    determining which data eigenvector in the set of data eigenvectors is a best match to the at least one of the data eigenvectors in the data frame; and
    outputting the multi-bit word that is mapped to the data eigenvector determined to be the best match to the at least one of the data eigenvectors.

14. The method of claim 13, wherein the determining includes:
    projecting each data eigenvector in the set of eigenvectors onto energy in the data frame, to produce respective eigenvector projections;
    generating confidence metrics based on the eigenvector projections; and selecting the data eigenvector from the set of data eigenvectors that is the best match to the at least one of the data eigenvectors based on the confidence metrics.

15. The method of claim 14, wherein the projecting includes performing a dot product of each data eigenvector in the set of data eigenvectors with the energy in the data frame to produce the respective eigenvector projections as dot products.

16. The method of claim 14, wherein:
generating the confidence metrics includes:
- computing a first ratio of a largest one of the eigenvector projections to a next largest one of the eigenvector projections;
- computing a second ratio of the largest one of the eigenvector projections to an average of the eigenvector projections; and the selecting includes selecting based on the first ratio and the second ratio.

17. The method of claim 16, wherein:
the generating confidence metrics further includes determining whether the first ratio is greater than a first predetermined threshold and whether the second ratio is greater than a second predetermined threshold that is greater than the first predetermined threshold; and the selecting further includes selecting the data eigenvector for which it is determined that the first ratio and the second ratio are respectively greater than the first predetermined threshold and the second predetermined threshold.

18. The method of claim 13, wherein:
the correlating includes correlating the acoustic signal with the replica of the pilot eigenvector to produce a correlation peak indicative of a presence of the pilot sequence; and the identifying includes identifying the data frame based on a time position of the correlation peak.

19. The method of claim 13, wherein each of the data eigenvectors in the set of data eigenvectors includes a sequence of PONS coefficients having a length equal to a first odd power of 2 and each of the replica of the pilot eigenvector and the pilot eigenvector includes a sequence of PONS coefficients having a second length equal to a second odd power of 2 that is greater than the first odd power of 2.

20. The method of claim 13, wherein the determining includes determining in the presence of the pilot sequence.

\* \* \* \* \*